United States Patent [19]
Paul et al.

[11] Patent Number: 6,072,991
[45] Date of Patent: Jun. 6, 2000

[54] COMPACT MICROWAVE TERRESTRIAL RADIO UTILIZING MONOLITHIC MICROWAVE INTEGRATED CIRCUITS

[75] Inventors: Jeffrey A. Paul, Torrance; Raymond Santos, Jr., Long Beach; Chaim Warzman, Torrance; Roy Wien, Cerritos; Steve Blacketer, Torrance; Richard T. Hennegan, Redondo Beach; Richard P. Mintzlaff, Granada Hills, all of Calif.

[73] Assignee: Raytheon Company, Lexington, Mass.

[21] Appl. No.: 08/707,181

[22] Filed: Sep. 3, 1996

[51] Int. Cl.[7] .................................................. H04B 1/38
[52] U.S. Cl. ........................ 455/73; 455/82; 455/90; 455/129; 455/269; 455/351; 343/702
[58] Field of Search ............................ 455/73, 76, 78, 455/79, 80, 81, 82, 83, 84, 575, 90, 128, 129, 269, 344, 351, 347, 88, 550; 343/702, 772

[56] References Cited

U.S. PATENT DOCUMENTS

| | | | |
|---|---|---|---|
| 3,611,146 | 10/1971 | Cooper et al. | 455/129 |
| 4,097,805 | 6/1978 | Fujii et al. | 455/78 |
| 5,239,685 | 8/1993 | Moe et al. | 455/73 |
| 5,266,961 | 11/1993 | Milroy | 343/772 |
| 5,371,901 | 12/1994 | Reed et al. | 455/88 |
| 5,404,581 | 4/1995 | Honjo | 455/90 |
| 5,500,888 | 3/1996 | Chiu et al. | 455/88 |
| 5,511,238 | 4/1996 | Bayraktaroglu | 455/81 |
| 5,606,732 | 2/1997 | Vignone, Sr. | 455/351 |
| 5,628,053 | 5/1997 | Araki et al. | 455/90 |

OTHER PUBLICATIONS

W. Gulloch et al.: "Development Of A Commerical, 38 GHZ, Communication Link" IEEE MTS International Microwave Symposium Digest, Altanta, Jun. 14–18, 1993, vol. 2, Jun. 14, 1993, Institute of Electrical and Electronics Engineers, pp. 681–684.

T. Podolak: "Alcatel 9400UL: New Family of Urban Microwave Links" Commutation Et Transmission, vol. 16, No. 2, Jan. 1, 1994, pp. 53–60.

*Primary Examiner*—Doris H. To
*Attorney, Agent, or Firm*—Leonard A. Alkov; William C. Schubert; Glenn H. Lenzen, Jr.

[57] ABSTRACT

An integrated point-to-point microwave radio frequency unit/antenna has a housing, a microwave antenna affixed to the front face of the housing, and a microwave radio frequency transceiver electronics package within the housing. The transceiver electronics package includes a circuit board having transmitter and receiver intermediate frequency processors. The transceiver electronics package further includes a microwave transmitter and a microwave receiver, each utilizing monolithic microwave integrated circuit architecture. The signals of the microwave transmitter and microwave receiver are preferably of different frequencies and are diplexed for communication with the antenna.

23 Claims, 8 Drawing Sheets

COMPACT MICROWAVE TERRESTRIAL RADIO UTILIZING MONOLITHIC MICROWAVE INTEGRATED CIRCUITS

BACKGROUND OF THE INVENTION

This invention relates to microwave radios, and, more particularly, to a radio frequency unit for a microwave radio.

Microwave radio communications are widely used to transfer large amounts of data, such as in earth and space microwave long-distance communications links. They are also of interest for shorter-range, lower-power applications such as the basic voice, video, and data links between a cellular base station and a central telephone office. In such applications, the microwave transmission distance is typically about ½–5 miles, the microwave signal is at a specific frequency in the range of about 2–94 GHz, and the power output of the microwave transmitter is about 100 milliwatts. Such microwave communications system are generally termed "point-to-point" systems.

Corresponding to the high-power microwave communications systems, a conventional point-to-point system has three basic physical parts: a signal processing unit (SPU), sometimes termed an "indoor" unit having the baseband radio components, a radio frequency (RF) unit (RFU), sometimes termed an "outdoor" unit having the microwave-frequency radio components, and an antenna. Because a microwave feed is required between the components operating at microwave frequency, the radio frequency unit is located within a few feet of the antenna, which ordinarily is mounted outside and aimed at another point-to-point terminal located some distance away. The antenna is typically a parabolic antenna of the cassegrain type. The signal processing unit may be located quite some distance from the radio frequency unit. An ordinary coaxial cable set extends between the signal processing unit and the radio frequency unit, but a microwave coaxial feed is required between the radio frequency unit and the antenna.

As point-to-point microwave systems become more popular, their physical packaging and aesthetic appearance become more important. The existing radio frequency units and antennas are bulky, heavy, visually obtrusive, and, in many cases, difficult to mount, align, and maintain in alignment. With the proliferation of point-to-point systems in large cities, new mounting space on existing masts and elsewhere has become more difficult to find. Installers must hoist the subsequently installed radio frequency unit and antenna to evermore-precarious locations in order to establish line-of-sight contact with the remote terminal. The radio frequency unit and the antenna must be mounted in close proximity to each other.

To overcome these problems, the assignee of the present invention is developing an integrated point-to-point microwave radio frequency unit and antenna, which is much more compact, lighter in weight, and visually less obtrusive than conventional systems. However, the size and weight of the microwave signal processing components provides a significant barrier to achieving these objectives, and there is accordingly a need for such microwave signal processing components and an architecture which results in smaller size and less weight. The present invention fulfills this need, and further provides related advantages.

SUMMARY OF THE INVENTION

The present invention provides an integrated point-to-point microwave radio frequency unit and antenna that is compact and light in weight. The microwave electronics package within the device is considerably smaller and lighter than in existing microwave radio frequency units, an important advantage that allows the entire radio frequency unit to be made smaller and lighter. The radio frequency unit using this approach is visually less obtrusive, and is easier to hoist, mount, align, and replace (if necessary) that conventional units.

In accordance with the invention, an integrated point-to-point microwave radio frequency unit/antenna comprises a microwave antenna having an antenna input/output feed, a housing, and a microwave radio frequency transceiver electronics package within the housing. The transceiver electronics package comprises a transmitter intermediate frequency processor having a baseband-frequency input and a microwave output, and a receiver intermediate frequency processor having a microwave input and a baseband-frequency output. The transceiver electronics package further includes a microwave transmitter and a microwave receiver, each having a monolithic microwave integrated circuit architecture. The microwave transmitter has an input in communication with the microwave output of the transmitter intermediate frequency processor and an output in microwave communication with the antenna input/output feed. The microwave receiver has an input in communication with the antenna input/output feed and an output in microwave communication with the microwave input of the receiver intermediate frequency processor. The transceiver electronics package also preferably includes a diplexer between the antenna and the microwave transmitter and the microwave receiver, to enable simultaneous transmission and reception of microwave signals at two different frequencies. A power supply and controller for the transceiver electronics package are also normally provided within the housing.

In conventional microwave processing technology, discrete components are typically used in those parts of the signal processor that operate in the microwave frequency range. These discrete components and the bulky waveguides separating them result in heavy, bulky structures. In the present approach, monolithic microwave integrated circuit (MMIC) technology has been utilized in the transmitter and receiver microwave-frequency circuits that process the microwave signals. Consequently, these circuits may be made in a modular form that is compact and light in weight.

These features, in combination with the use of the preferred integrated flat antenna, allow the integrated point-to-point microwave radio frequency unit/antenna to have a rectangular prismatic shape with size of about 12 inches by about 12 inches by about 3 inches thick and a weight of less than about 15 pounds. The integrated radio frequency unit and antenna therefore are much easier to install in precarious locations than conventional non-integrated radio frequency units and parabolic antennas. The integrated radio frequency unit and antenna are less aesthetically objectionable than prior systems and require less support structure.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
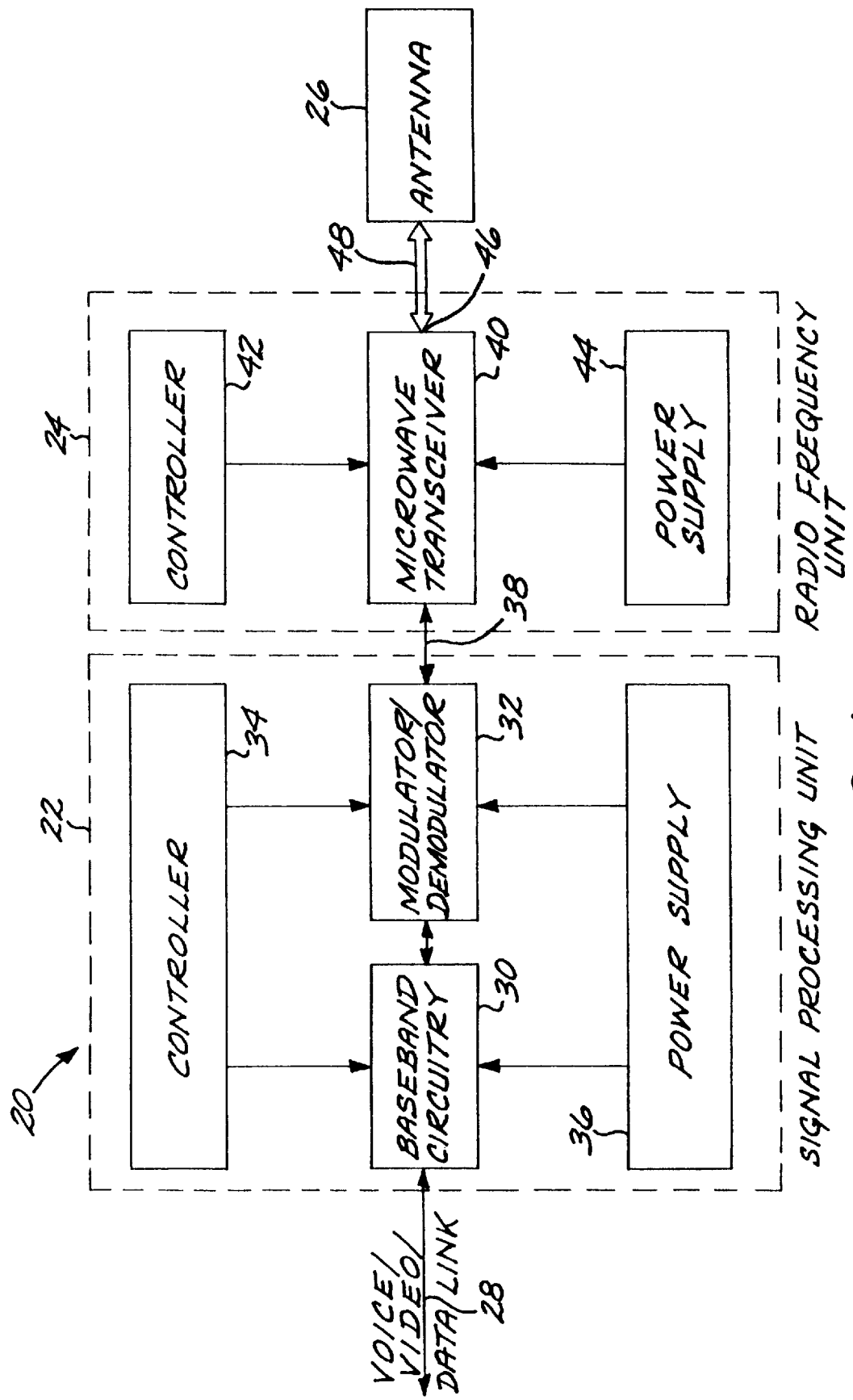
FIG. 1 is a schematic diagram of a microwave radio transmitter and receiver.

FIG. 1 is a schematic diagram of a microwave radio transceiver system 20. The general electronic structure of such systems 20 as shown in FIG. 1 is known in the art and is described in greater detail, for example, in "RF Components for PCS Base Stations", published by Strategies Unlimited, 1996. The present invention resides in part in an improved architecture for the implementation of this basic electronics approach.

The system 20 includes a signal processing unit 22 (also known as the "indoor unit") that processes baseband signals, a radio frequency unit 24 (also known as the "outdoor unit") that processes microwave signals, and a microwave antenna 26. The signal processing unit 22 has an input/output of voice, video, and/or data link information through a cable 28. This information is processed through baseband circuitry 30 and a modulator/demodulator 32. A controller 34 and a power supply 36 are also provided. The signal processing unit 22 communicates with the radio frequency unit 24 at low frequencies through a conventional signal cable 38.

The radio frequency unit 24 includes a microwave transceiver 40 that includes circuitry for both intermediate frequency processing and microwave frequency processing within a selected narrower range of the broad band extending from about 2 to about 94 GHz (Gigahertz), by converting the low-frequency signal operable in the signal processing unit 22. The implementation of the architecture of the radio frequency unit 24 is a key feature of the invention and will be discussed in more detail subsequently. A controller 42 and a power supply 44 are also provided within the radio frequency unit 24.

The microwave transceiver 40 has an antenna connection 46 into which a microwave radio frequency feed 48 is connected to provide a signal to the antenna 26, or to receive a signal from the antenna 26. The feed 48 is typically a coaxial cable or waveguide which cannot be more than a few feet long without suffering substantial signal attenuation.

Figure 2:
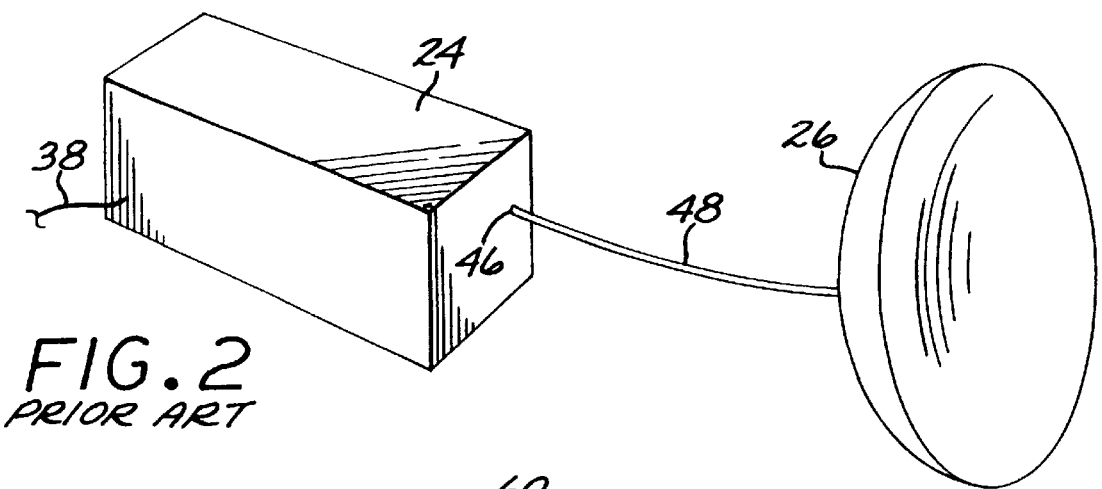
FIG. 2 is a perspective view of a conventional microwave radio frequency unit and antenna.

FIG. 2 depicts the implementation of a conventional prior radio frequency unit 24 and antenna 26, connected by the microwave feed 48, which utilizes the electronics approach of FIG. 1. The radio frequency unit 24 typically has measurements of 12 inches by 12 inches by 12 inches and weighs about 35 pounds. The antenna 26 is a cassegrain parabolic antenna having a dish diameter of about 12 inches or more and a weight of about 15 pounds. Both components must be mounted at a location such that the antenna 26 may be aimed at a similar but remotely located terminal. The installer must find a way to mount the antenna 26 so that it is aligned with the antenna of the remote unit, and to mount the radio frequency unit 24 so that it is secure yet is within the range permitted by the length of the microwave feed 48. Other versions of the prior approach of FIG. 2 are known wherein the parabolic antenna is affixed directly to the radio frequency unit, but such a combined approach remains awkward to handle and heavy.

Figure 3:
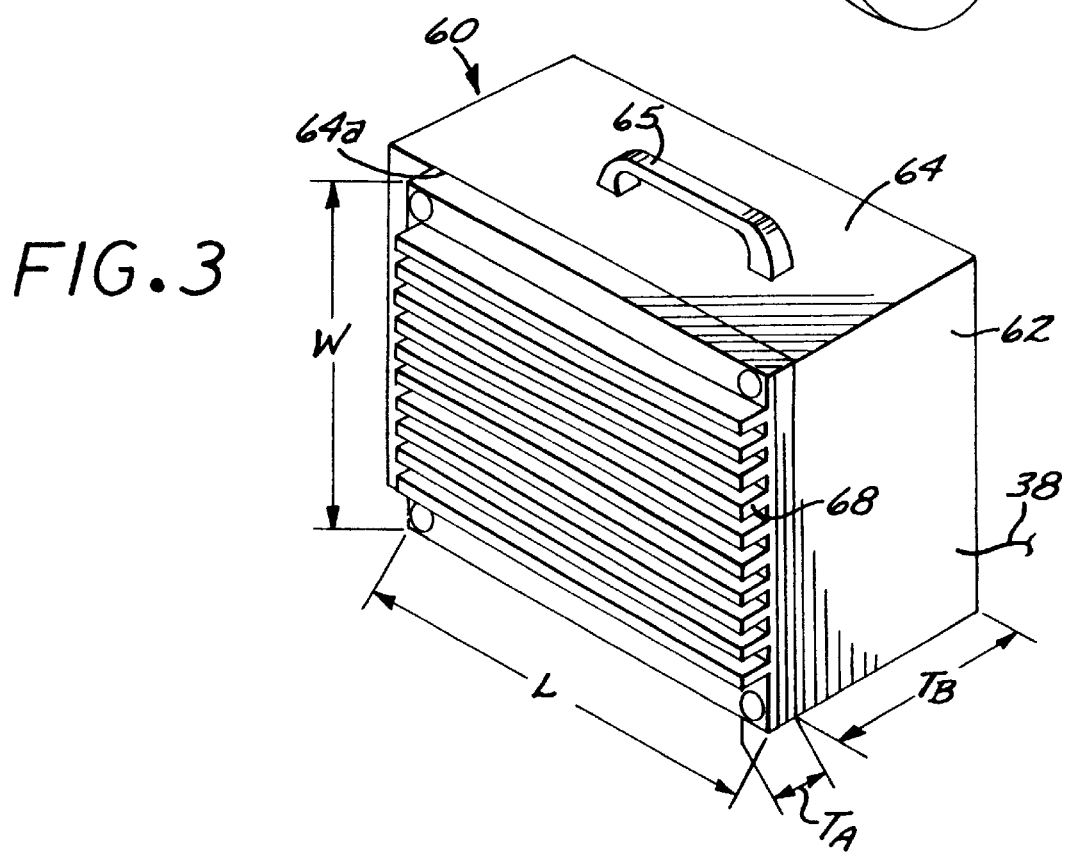
FIG. 3 is a perspective view of an integrated radio frequency unit/antenna according to the invention.
Figure 4:
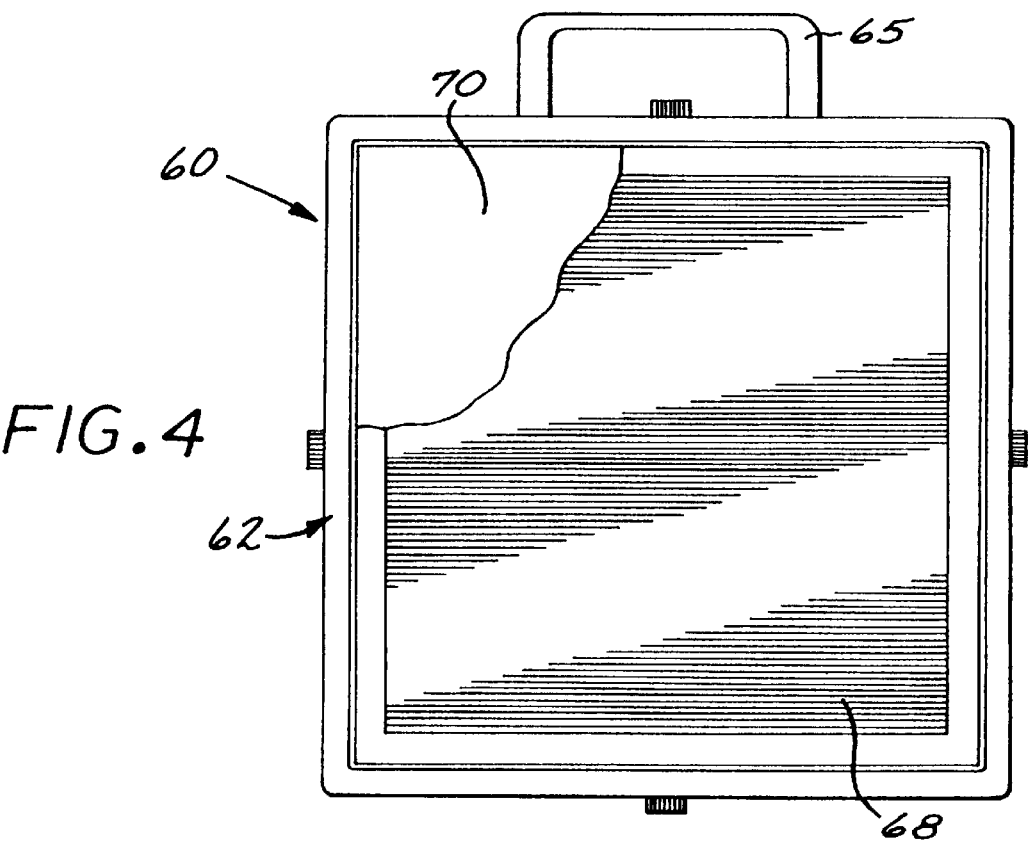
FIG. 4 is a partially sectioned front elevational view of an preferred integrated radio frequency unit/antenna according to the invention.
Figure 5:
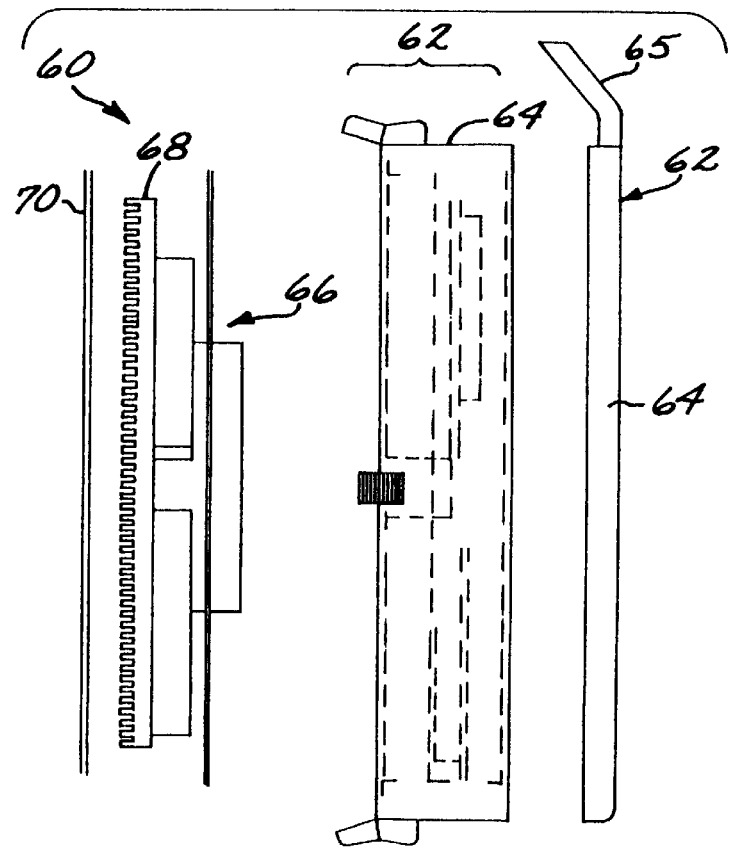
FIG. 5 is an exploded side elevational view of the integrated radio frequency unit/antenna of FIG. 4, illustrating a typical layout of components.

FIG. 3 shows an integrated radio frequency unit/antenna of the present invention in perspective view. FIG. 4 illustrates a preferred form of the present invention in partially sectioned front elevational exterior view, and FIG. 5 is an exploded side view of the preferred apparatus. This apparatus uses the general electronics approach of FIG. 1, but with a different architecture and antenna that offer important advantages. An integrated radio frequency unit/antenna 60 includes a housing 62 having an exterior wall 64. A handle 65, which may be integral or detachable, extends from the housing 62 and permits the radio frequency unit/antenna 60 to be easily carried. A microwave radio frequency transceiver electronics package 66 is fixed within the housing 62. The electronics package 66 includes the microwave transceiver 40, the controller 42, and the power supply 44. Part of the exterior wall 64 is formed as an integral flat antenna 68. The flat antenna 68 may be formed separately and attached to the wall 64, as illustrated, or it may be formed as part of the wall itself. That portion of the wall 64 which is not the antenna 68 may be made of any operable material, such as a metal or a plastic. A radome 70 in the form of a plastic sheet is mounted over the face of the flat antenna 68 to protect it.

The flat antenna 68 is preferably a continuous transverse stub (CTS) antenna. The CTS microwave antenna is known in the art and is described, for example, in U.S. Pat. No. 5,266,961, whose disclosure is incorporated by reference. In general terms, and as illustrated in FIGS. 3 and 5, the CTS antenna has a dielectric element with a first portion and a second portion extending generally transversely to the first portion. The second portion forms a transverse stub that protrudes from a first surface of the first portion. A first conductive element is disposed coextensively with the dielectric element along a second surface of the first portion. A second conductive element is disposed along the first surface of the dielectric element and is along transversely extending edgewalls formed by the second portion of the dielectric element. Further details of construction are disclosed in the '961 patent.

The CTS antenna has particular advantages when used in the present application. The CTS antenna is planar, small in lateral dimensions and thickness, and light in weight. The output signal of the CTS antenna may be steered slightly electronically. During mounting, the radio frequency unit/antenna 60 must be aligned generally toward the remote unit with which communication is established. However, that alignment may be slightly disrupted due to weather or temperature effects on the mounting structure. In that case, the small deviation from proper alignment may be compensated for electronically to maintain a high signal strength aimed at the remote unit.

The integrated radio frequency unit/antenna 60 has an antenna connection and a microwave radio frequency feed cable extending from the antenna connection to the back side of the flat antenna 68, although the antenna connection and feed cable are not visible in FIGS. 3–5. The radio frequency feed is at most 1–2 inches long and contained entirely within the housing 62. There is very little microwave attenuation as the signal passes through this short feed. The installer is only required to position and fix in place the single integrated radio frequency unit/antenna 60, and is not concerned with moving and positioning two units in a compatible manner.

Figure 6:
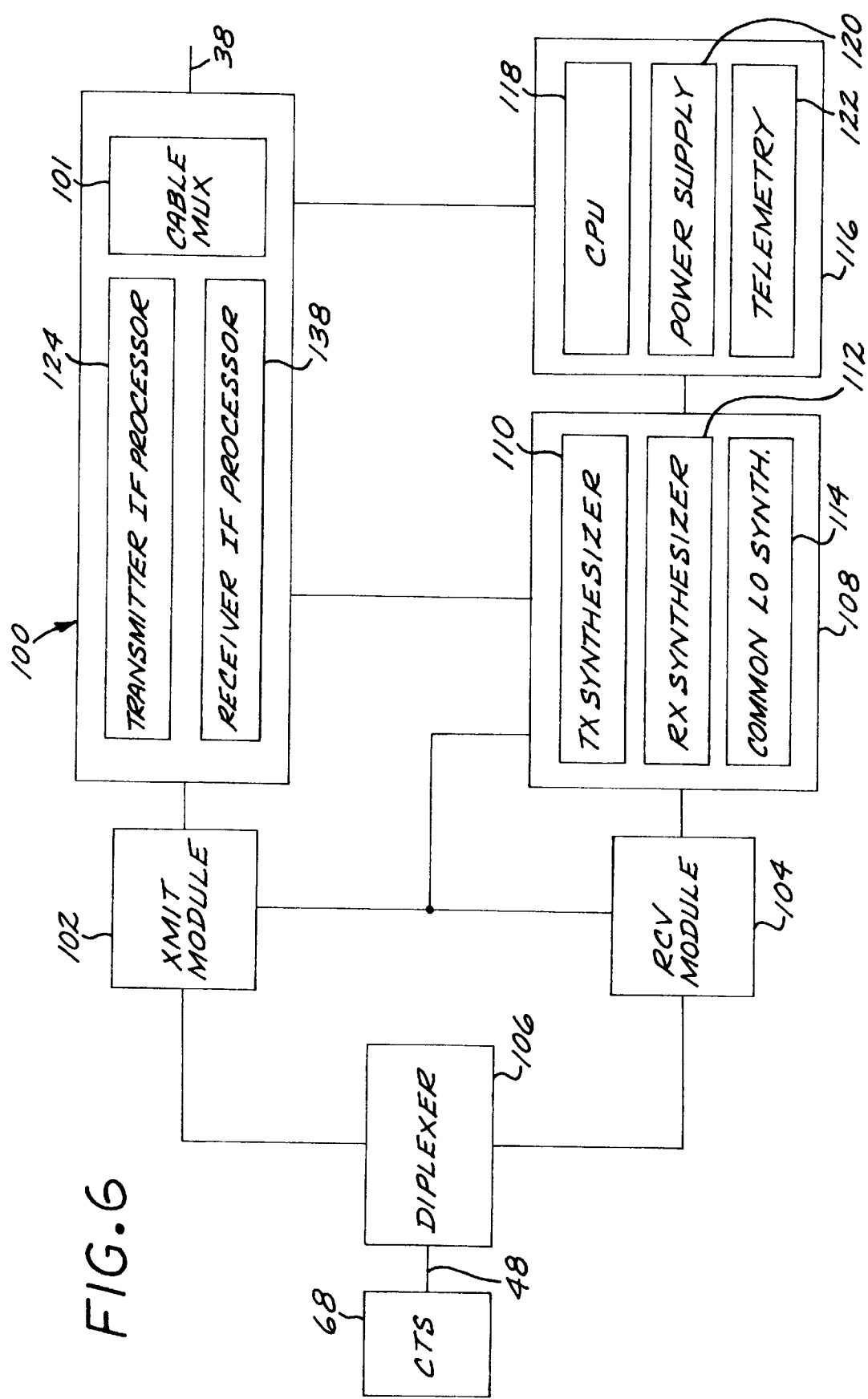
FIG. 6 is an electronic circuit block diagram of the preferred implementation of the radio frequency unit.

FIGS. 6–10 illustrate the implementation of the electronic circuitry of the radio frequency unit 24. FIG. 6 shows the complete circuit, and FIGS. 7–10 illustrate the transmitter IF processor, the receiver IF processor, the microwave-frequency transmitter module, and the microwave-frequency receiver module, respectively. The principal function of this circuitry is to communicate signal information between the antenna 68, operating at about 37–40 GHz in the preferred embodiment, and the signal processing unit 22, operating at about 70–310 MHz in the preferred embodiment. This communication requires extensive upshifting and downshifting of the frequency of the signal.

As seen in FIG. 6, the electronic circuitry of the radio frequency unit 24 includes an IF processor card 100 that communicates at its low-frequency side through a multiplexer 101 with the signal processing unit 22 over the communication cable 38. The high-frequency side of the IF processor card 100 communicates with a microwave transmitter module 102 and a microwave receiver module 104. These microwave-frequency modules 102 and 104, which operate at different frequencies, communicate with the CTS antenna 68 through a diplexer 106. The diplexer 106, a known device, contains filters which permit the simultaneous transmission and receipt of microwave signals of different frequencies. Constant-frequency signals required in the signal processing are synthesized on a synthesizer card 108, which includes a transmitter synthesizer 110, a receiver synthesizer 112, and a common local oscillator (LO) synthesizer 114.

Control and power functions are supplied from a control/power card 116, which includes a central processing unit 118, a power supply 120, and a telemetry unit 122. The telemetry unit 122 monitors and reports the status of the radio frequency unit 24 to the signal processing unit 22 and receives command signals from the signal processing unit 22. The central processing unit 118 monitors and reports the status of the radio frequency unit 24 to the telemetry unit 122, and also controls functions such as automatic gain and levelling, maintenance of transmitter output power at a constant level, and maintenance of receiver signal output at a constant level.

Figure 7:
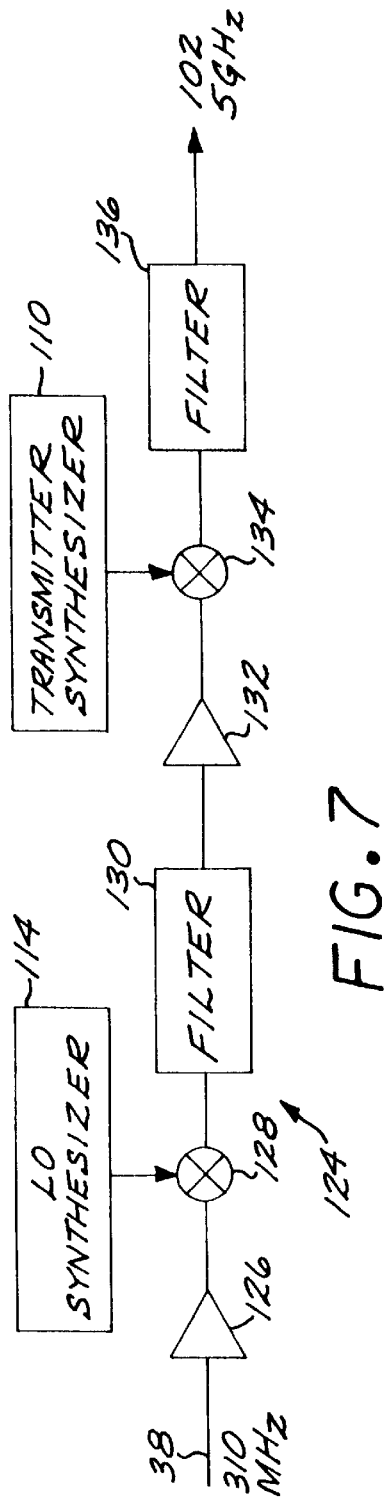
FIG. 7 is an electronic circuit block diagram of the preferred implementation of the transmitter IF processor.

FIG. 7 illustrates the components of a transmitter IF processor 124 on the IF processor card 100. Signals to be transmitted by microwave are received from the signal processing unit 22, at 310 MHz in the preferred embodiment. The input signals are amplified as necessary by an amplifier 126. The output signal of the amplifier is mixed by a mixer 128 with the signal produced by the LO synthesizer 114 to create an intermediate frequency signal that is filtered by a filter 130 and amplified as necessary by an amplifier 132. The amplified signal is mixed in a mixer 134 with the signal produced by the transmitter synthesizer 110 to create another intermediate frequency signal that is filtered by a filter 136. The final output signal is provided to the transmitter module 102. In the preferred embodiment, the output is a signal in the about 5 GHz range.

Figure 8:
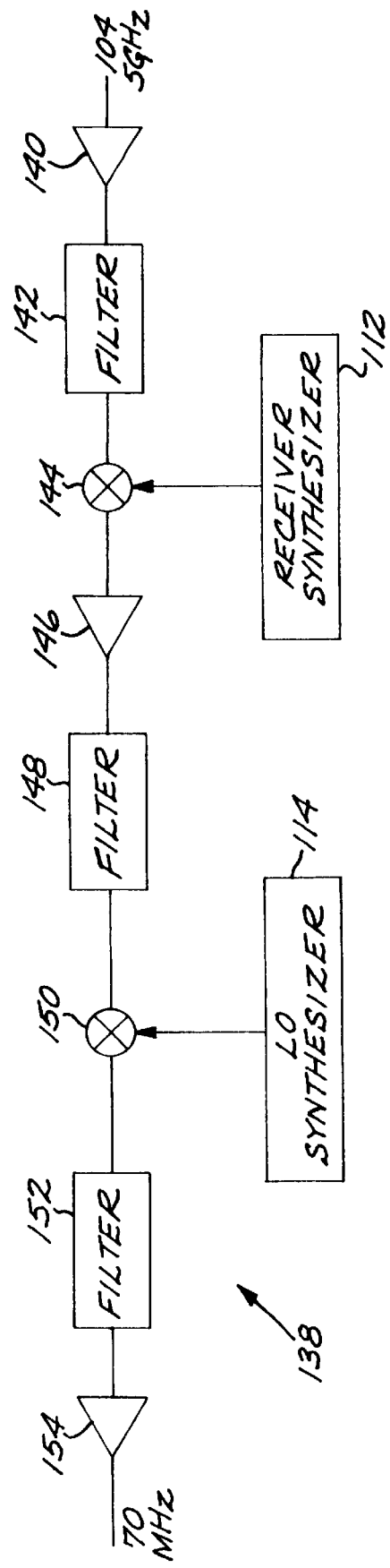
FIG. 8 is an electronic circuit block diagram of the preferred implementation of the receiver IF processor.

A receiver IF processor 138 operates in a similar matter to the transmitter IF processor 124, except to reduce frequencies. As shown in FIG. 8, signals received by microwave transmission are provided from the receiver module 104, at about 5 GHz in the preferred embodiment. The input signals are amplified as necessary by an amplifier 140. The output of the amplifier 140 is filtered by a filter 142 and then mixed in a mixer 144 with the output signal of the receiver synthesizer 112. The mixed signal is amplified by an amplifier 146, filtered by a filter 148, and mixed with the output signal of the LO synthesizer 114 by a mixer 150. The mixed signal is filtered by a filter 152 and amplified by an amplifier 154. In the preferred embodiment, the output is a signal in the 70 MHz range and is fed to the signal processing unit 22 over the cable 38.

All of the components and of the IF processors 124 and 138 are available commercially or known. In a prototype embodiment of the invention, the amplifiers are preferably RF2304 amplifiers made by RF Microdevices, the filters are ceramic resonator filters made by Lark Engineering, and the mixers are doubly balanced mixers made by RF Prime. These components are placed on the circuit board of the IF processor card 100 mounted within the housing 62 and interconnected in the manner illustrated.

Figure 9:
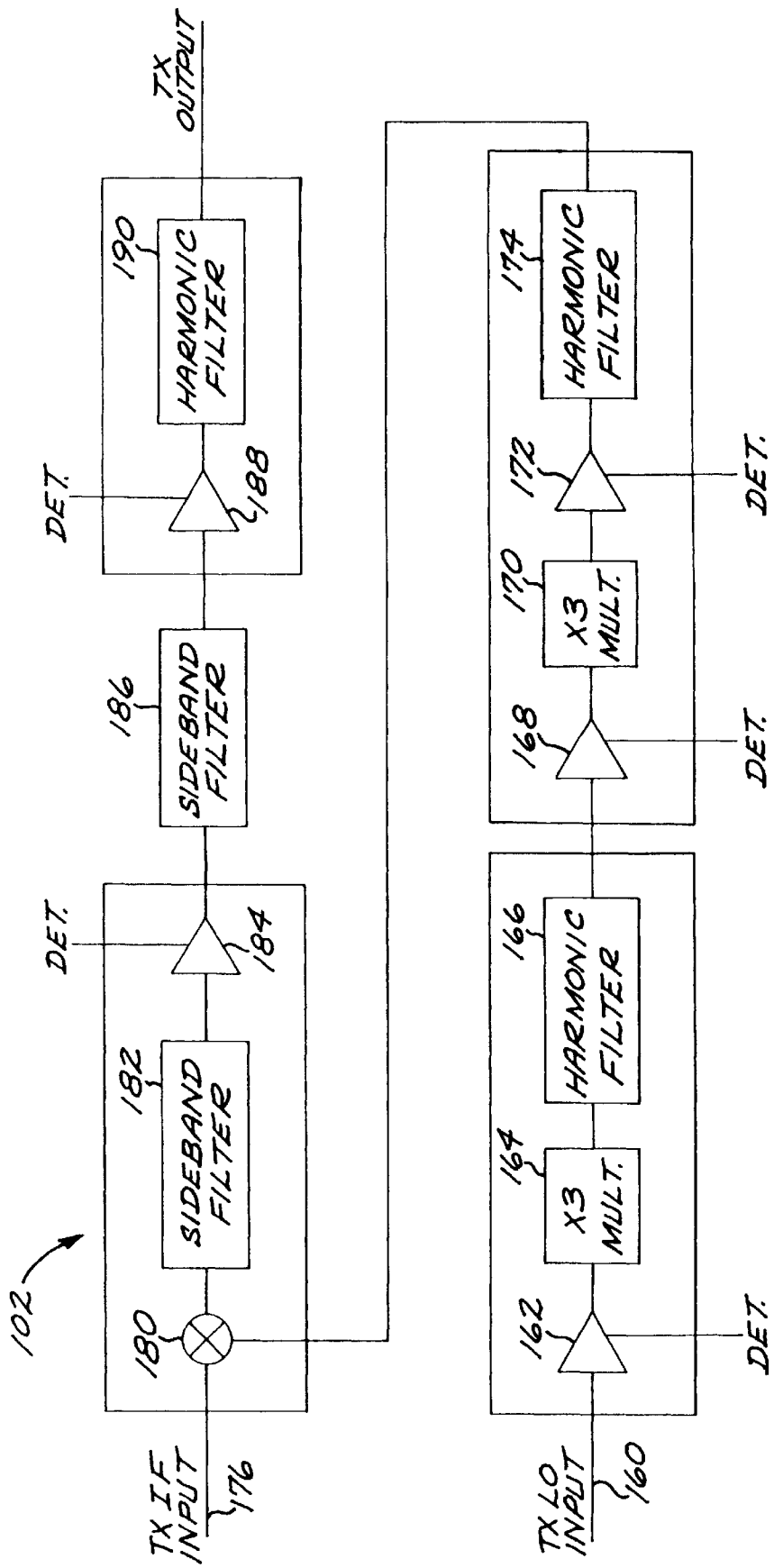
FIG. 9 is an electronic circuit block diagram of the preferred implementation of the microwave-frequency transmitter module.

FIG. 9 illustrates the components of the microwave transmitter module 102. A mixing signal is generated by providing a transmitter LO input 160 from the transmitter synthesizer 110. In the preferred embodiment, the transmitter LO input 160 is about 3.5–3.9 GHz. The transmitter LO input 160 is amplified as necessary by an amplifier 162, frequency multiplied by an integer factor, 3 in the preferred embodiment, by a frequency multiplier 164, filtered to remove undesired frequency components by a harmonic filter 166, amplified as necessary by an amplifier 168, again frequency multiplied by an integer factor, 3 in the preferred embodiment, by a frequency multiplier 170, amplified as necessary by an amplifier 172, and again filtered to remove undesired frequency components by a harmonic filter 174. In the preferred embodiment, the output of the harmonic filter 174 is at about 32 GHz.

A transmitter IF input 176 is supplied from the transmitter IF processor as the output of the filter 138, at about 5 GHz in the preferred embodiment. This input signal 176 is mixed with the output of the harmonic filter 174 in a mixer 180, filtered to remove sideband components in a filter 182, amplified as necessary by an amplifier 184, again sideband filtered in a filter 186, amplified as necessary by an amplifier 188, and frequency filtered by a filter 190 to obtain a single-frequency output signal that is provided as an input to the diplexer 106. In the preferred embodiment, the output of the filter 190 is selectable within the range of 37–40 GHz.

Figure 10:
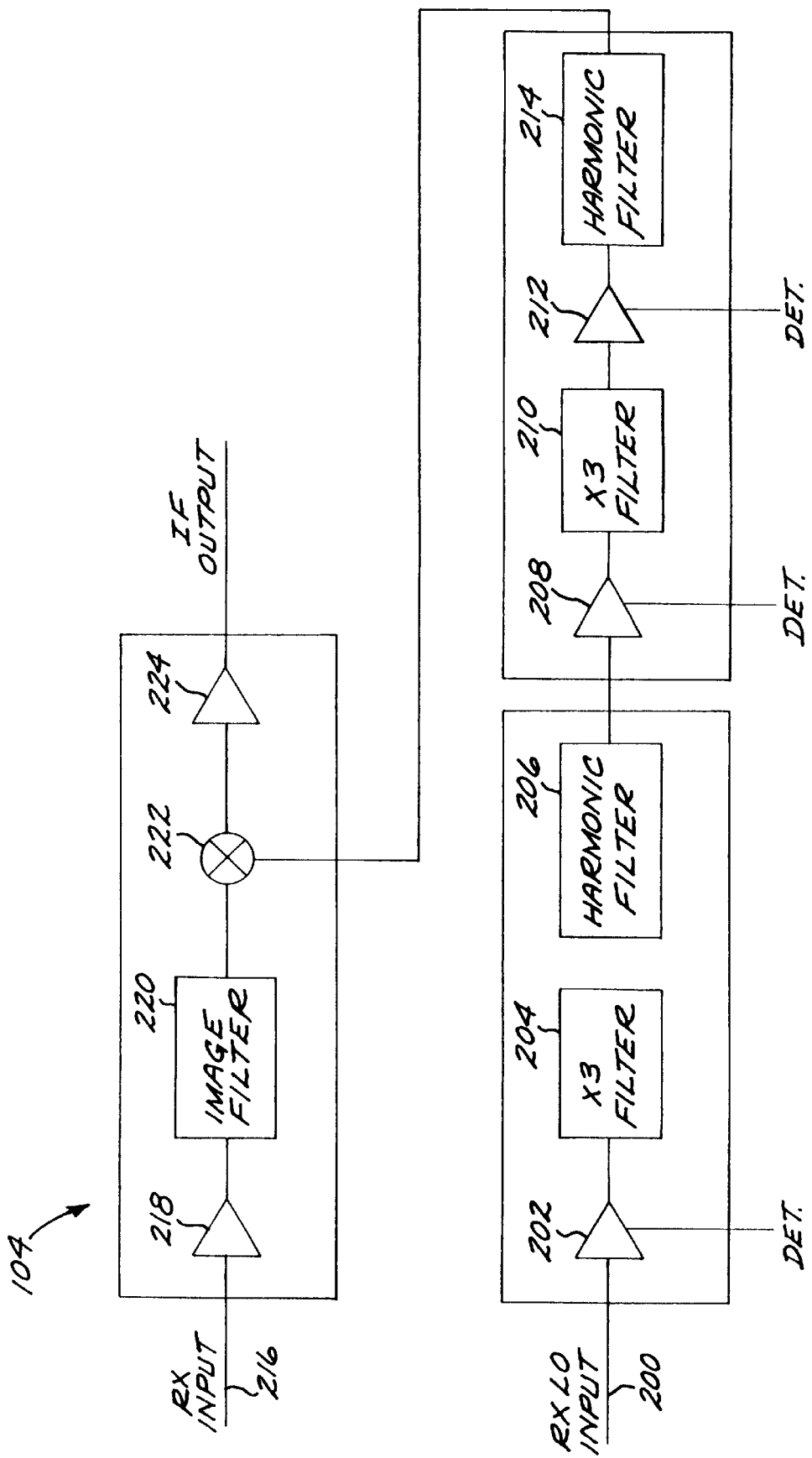
FIG. 10 is an electronic circuit block diagram of the preferred implementation of the microwave-frequency receiver module.

The microwave receiver module 104, illustrated in FIG. 10, operates in a similar fashion to the microwave transmitter module. A receiver LO input 200 generated by the receiver synthesizer 112 is amplified as necessary by an amplifier 202, frequency multiplied by a constant integer, 3 in the preferred embodiment, by a frequency multiplier 204, filtered to remove frequency components other than that desired by a harmonic filter 206, again amplified as necessary by an amplifier 208, again frequency multiplied by a constant integer, 3 in the preferred embodiment, by a frequency multiplier 210, amplified as necessary by an amplifier 212, and again filtered to remove frequency components other than that desired by a harmonic filter 214. In the preferred embodiment, the receiver LO input 200 is at about 3.5–3.9 GHz, and the output of the harmonic filter 214 is at about 32 GHz.

A receiver input 216 is received from the diplexer 106. In a preferred embodiment, the receiver input 216 is at about 37–40 GHz. That signal is amplified as necessary by an amplifier 218, image filtered by a filter 220 to remove image components (at 27–30 GHz in the preferred embodiment), and mixed with the output signal of the harmonic filter 214 in a mixer 222. The output signal of the mixer 222 is at a frequency that is the difference between that of the input signal 216 and the mixing signal output from the harmonic filter 214, in the preferred case about 5 GHz. This signal is amplified as necessary by an amplifier 224 and supplied as the input 48 to the receiver IF processor 140.

The transmitter module 102, the receiver module 104, and the diplexer 106 are implemented using monolithic microwave integrated circuit (MMIC) architecture. This integrated circuit approach for microwave circuits and its processing procedures are known generally in the art for other applications and are described, for example, George Vendelin, "Microwave Circuit Design Using Linear and Nonlinear Techniques", John Wiley, 1990. U.S. Pat. Nos. 4,837,530; 4,890,077; 4,947,136; and 5,319,329, whose disclosures are incorporated by reference, describe the use of MMIC techniques. Commercial components using MMIC technology are available, such as various amplifiers made by Alpha Industries. In this approach, the components of FIGS. 9 and 10 are fabricated as thin-film elements, preferably based on gallium-arsenide technology, separated by trace-type waveguides rather than conventional hollow or stripline waveguides.

Figure 11:
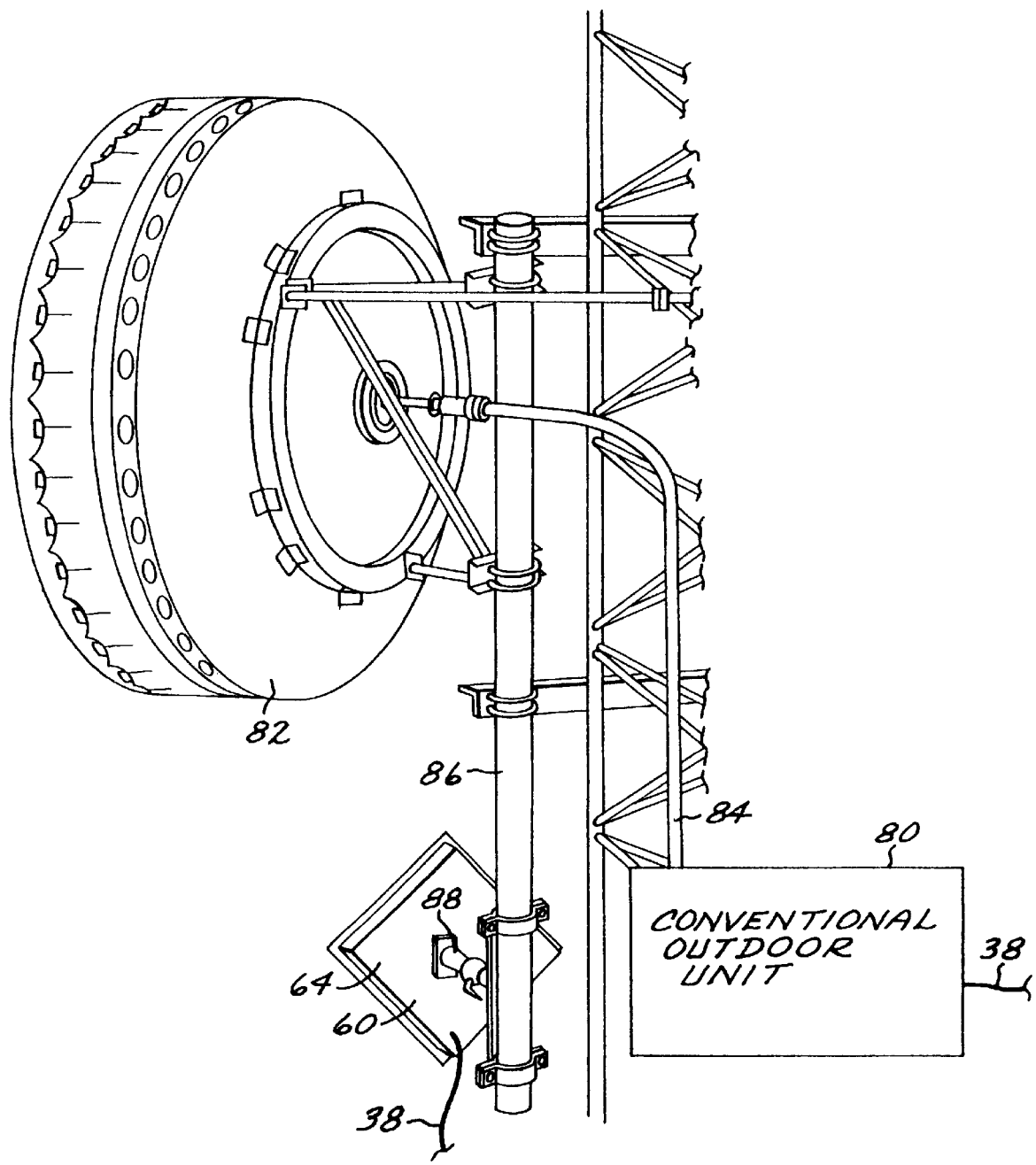
FIG. 11 is a schematic perspective view of a conventional radio frequency unit and antenna and an integrated radio frequency unit/antenna mounted to a mast.

FIG. 11, which is schematic and not drawn to scale, illustrates the mounting of a conventional radio frequency unit 80 and its antenna 82, connected by their microwave feed 84, on a mast 86. Also shown is an integrated radio frequency unit/antenna 60 of the invention. The integrated radio frequency unit/antenna 60 has a mounting bracket 88 attached to one of the exterior walls 64 other than the one to which the integrated flat antenna 68 is attached, and the mounting bracket permits straightforward adjustable attachment to the mast 86. It is apparent that the approach of the invention is much more convenient for installation and alignment than the conventional approach. The integrated radio frequency unit/antenna 60 can also be mounted in locations and places which are largely not usable with the conventional device. For example, the integrated radio frequency unit/antenna 60 is readily mounted to a window frame in much the same manner as a room air conditioner.

The inventors have developed a prototype design for the integrated radio frequency unit/antenna 60, shown in FIGS. 3–5, for operation at a microwave frequency of 37–40 GHz, using the approach of the invention. The flat antenna has a width W of about 10½ inches, a length L of about 10½ inches, and a thickness $T_A$ of about 1 inch. The remaining components, the microwave transceiver 40, controller 42, and power supply 44 fit into a housing having the same length and width, and a thickness $T_B$ of about 2 inches. The total size of the housing and antenna package is about 12 inches by 12 inches by 3 inches. The weight of the integrated radio frequency unit/antenna 60 is about 13 pounds. It is desirable that the weight of the radio frequency unit/antenna be less than about 15 pounds, so as to be readily lifted and handled by an installer.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An integrated point-to-point microwave radio frequency unit/antenna, comprising:
    a housing;
    a microwave antenna affixed to and integral with the housing and having an antenna input/output feed contained entirely within the housing; and
    a microwave radio frequency transceiver electronics package within the housing, the transceiver electronics package comprising
        a transmitter intermediate frequency processor having a baseband-frequency input and a microwave output,
        a receiver intermediate frequency processor having a microwave input and a baseband-frequency output,
        a microwave transmitter having a monolithic microwave integrated circuit architecture, the microwave transmitter having an input in communication with the microwave output of the transmitter intermediate frequency processor and an output in microwave communication with the antenna input/output feed, and
        a microwave receiver having a monolithic microwave integrated circuit architecture, the microwave receiver having an input in communication with the antenna input/output feed and an output in microwave communication with the microwave input of the receiver intermediate frequency processor.

2. The integrated point-to-point microwave radio frequency unit/antenna of claim 1, further including:
    a microwave diplexer having a monolithic microwave integrated circuit architecture, the microwave diplexer having as an input/output the antenna input/output feed, as an input the output of the microwave transmitter, and as an output the input of the microwave receiver.

3. The integrated point-to-point microwave radio frequency unit/antenna of claim 1, further including:
    a power supply within the housing, the power supply having power leads to the transmitter intermediate frequency processor, the receiver intermediate frequency processor, the microwave transmitter, and the microwave receiver.

4. The integrated point-to-point microwave radio frequency unit/antenna of claim 1, further including:
    a controller within the housing, the controller being in communication with the transmitter intermediate frequency processor, the receiver intermediate frequency processor, the microwave transmitter, and the microwave receiver.

5. The integrated point-to-point microwave radio frequency unit/antenna of claim 1, wherein the transmitter intermediate frequency processor comprises
    at least one frequency mixer operable to increase the frequency of the baseband frequency input,
    at least one filter in series with the frequency mixer, and
    at least one amplifier in series with the filter.

6. The integrated point-to-point microwave radio frequency unit/antenna of claim 1, wherein the receiver intermediate frequency processor comprises
    at least one frequency mixer operable to decrease the frequency of the microwave input,
    at least one filter in series with the frequency mixer, and
    at least one amplifier in series with the filter.

7. The integrated point-to-point microwave radio frequency unit/antenna of claim 1, wherein the microwave transmitter comprises at least one frequency mixer operable to increase the frequency of the microwave output of the transmitter intermediate frequency processor, at least one filter in series with the frequency mixer, and at least one amplifier in series with the filter.

8. The integrated point-to-point microwave radio frequency unit/antenna of claim 1, wherein the microwave receiver comprises at least one frequency mixer operable to decrease the frequency of the antenna input/output feed, at least one filter in series with the frequency mixer, and at least one amplifier in series with the filter.

9. The integrated point-to-point microwave radio frequency unit/antenna of claim 1, wherein the microwave radio frequency transceiver electronics package further includes a frequency synthesizer.

10. The integrated point-to-point microwave radio frequency unit/antenna of claim 1, wherein the housing has a size of no more than about 12 inches by 12 inches by about 3 inches.

11. The integrated point-to-point microwave radio frequency unit/antenna of claim 1, wherein the housing, the antenna, and the electronics package together weigh less than about 15 pounds.

12. The integrated point-to-point microwave radio frequency unit/antenna of claim 1, wherein the transmitter intermediate frequency processor and the receiver intermediate frequency processor are mounted together on a single circuit board.

13. The integrated point-to-point microwave radio frequency unit/antenna of claim 1, wherein the microwave transmitter transmits at a first microwave frequency and the microwave receiver receives a second microwave frequency different from the first microwave frequency.

14. The integrated point-to-point microwave radio frequency unit/antenna of claim 1, wherein the microwave output of the transmitter intermediate frequency processor has a frequency of from about 2 to about 94 GHz.

15. The integrated point-to-point microwave radio frequency unit/antenna of claim 1, wherein the antenna is a flat antenna.

16. The integrated point-to-point microwave radio frequency unit/antenna of claim 1, wherein antenna is a continuous transverse stub antenna.

17. An integrated point-to-point microwave radio frequency unit/antenna, comprising:

a housing having a front face;

a microwave antenna affixed to, integral with, and forming a portion of the front face of the housing and having an antenna input/output feed contained entirely within the housing;

a microwave diplexer within the housing and having a monolithic microwave integrated circuit architecture, the microwave diplexer having as an input/output the antenna input/output feed, a microwave transmitter input, and a microwave receiver output;

a microwave radio frequency transceiver electronics package within the housing, the transceiver electronics package comprising a circuit board having a transmitter intermediate frequency processor having a baseband-frequency input and a microwave output, and a receiver intermediate frequency processor having a microwave input and a baseband-frequency output;

a microwave transmitter having a monolithic microwave integrated circuit architecture, the microwave transmitter having an input in communication with the microwave output of the transmitter intermediate frequency processor and an output in microwave communication with the microwave transmitter input of the microwave diplexer;

a microwave receiver having a monolithic microwave integrated circuit architecture, the microwave receiver having an input in communication with the antenna input/output feed and an output in microwave communication with the microwave receiver input of the microwave diplexer;

a power supply within the housing, the power supply having power leads to the circuit board, the microwave transmitter, and the microwave receiver; and a controller within the housing, the controller being in communication with the circuit board, the microwave transmitter, and the microwave receiver.

18. The integrated point-to-point microwave radio frequency unit/antenna of claim 17, wherein the microwave transmitter comprises at least one frequency mixer operable to increase the frequency of the microwave output of the transmitter intermediate frequency processor, at least one filter in series with the frequency mixer, and at least one amplifier in series with the filter.

19. The integrated point-to-point microwave radio frequency unit/antenna of claim 17, wherein the microwave receiver comprises at least one frequency mixer operable to decrease the frequency of the antenna input/output feed, at least one filter in series with the frequency mixer, and at least one amplifier in series with the filter.

20. The integrated point-to-point microwave radio frequency unit/antenna of claim 17, wherein the housing has a size of no more than about 12 inches by 12 inches by about 3 inches.

21. The integrated point-to-point microwave radio frequency unit/antenna of claim 17, wherein the housing, the antenna, and the electronics package together weigh less than about 15 pounds.

22. The integrated point-to-point microwave radio frequency unit/antenna of claim 17, wherein the antenna is a flat antenna.

23. The integrated point-to-point microwave radio frequency unit/antenna of claim 17, wherein antenna is a continuous transverse stub antenna.

* * * * *